United States Patent
Itoh et al.

(10) Patent No.: US 9,106,837 B2
(45) Date of Patent: Aug. 11, 2015

(54) IMAGE CAPTURING DEVICE AND IMAGE CAPTURING METHOD

(75) Inventors: Kei Itoh, Kanagawa (JP); Yoichi Ito, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 10 days.

(21) Appl. No.: 13/978,452

(22) PCT Filed: Jan. 10, 2012

(86) PCT No.: PCT/JP2012/050657
§ 371 (c)(1),
(2), (4) Date: Jul. 5, 2013

(87) PCT Pub. No.: WO2012/096395
PCT Pub. Date: Jul. 19, 2012

(65) Prior Publication Data
US 2013/0278809 A1    Oct. 24, 2013

(30) Foreign Application Priority Data
Jan. 13, 2011  (JP) .................................. 2011-004858

(51) Int. Cl.
*G03B 13/00*   (2006.01)
*H04N 5/232*   (2006.01)
(Continued)

(52) U.S. Cl.
CPC .............. *H04N 5/23293* (2013.01); *G02B 7/38* (2013.01); *G03B 13/20* (2013.01); *G03B 13/36* (2013.01);
(Continued)

(58) Field of Classification Search
CPC .... G03B 13/32; G03B 13/12; H04N 5/23212; H04N 5/23216; H04N 5/23219
See application file for complete search history.

(56) References Cited

U.S. PATENT DOCUMENTS

| | | | |
|---|---|---|---|
| 7,034,881 B1 * | 4/2006 | Hyodo et al. | ............ 348/333.12 |
| 2006/0029377 A1 | 2/2006 | Stavely et al. | |

(Continued)

FOREIGN PATENT DOCUMENTS

| | | |
|---|---|---|
| EP | 2 026 567 A1 | 2/2009 |
| EP | 2 106 126 A2 | 9/2009 |

(Continued)

OTHER PUBLICATIONS

International Search Report issued Apr. 17, 2012 in PCT/JP2012/050657 filed Jan. 10, 2012.

(Continued)

*Primary Examiner* — Twyler Haskins
*Assistant Examiner* — Angel L Garces-Rivera
(74) *Attorney, Agent, or Firm* — Oblon, McClelland, Maier & Neustadt, L.L.P.

(57) ABSTRACT

An image capturing device includes: an image capturing unit that captures a subject image through a lens and converts the subject image into an electric signal; an image displaying unit that displays an image; a designation accepting unit that is provided on a display surface of the image displaying unit and that accepts designation of a plurality of positions on the image displayed on the image displaying unit; a range-finding unit that performs range finding of a distance to a subject by using a plurality of two-dimensional image sensors; an area setting unit that sets a range-finding area obtained from a range finding result for a region that includes the plurality of positions designated through the designation accepting unit; a position determining unit that determines in-focus positions based on distances of the range-finding areas; and a continuous shooting unit that performs image capturing at the in-focus positions.

8 Claims, 20 Drawing Sheets

(51) Int. Cl.
  *G02B 7/38*   (2006.01)
  *G03B 13/20*  (2006.01)
  *G03B 13/36*  (2006.01)
  *G03B 17/18*  (2006.01)
(52) U.S. Cl.
  CPC ............ *G03B 17/18* (2013.01); *H04N 5/23212* (2013.01); *H04N 5/23216* (2013.01); *H04N 5/23219* (2013.01)

(56) References Cited

U.S. PATENT DOCUMENTS

| | | |
|---|---|---|
| 2008/0136958 A1 | 6/2008 | Nakahara |
| 2009/0047010 A1 | 2/2009 | Yoshida et al. |
| 2009/0244357 A1 | 10/2009 | Huang |
| 2010/0322611 A1 | 12/2010 | Yoshida et al. |
| 2013/0002940 A1 | 1/2013 | Stavely et al. |

FOREIGN PATENT DOCUMENTS

| | | |
|---|---|---|
| JP | 39-5265 | 4/1964 |
| JP | 04-158322 | 6/1992 |
| JP | 11-025263 | 1/1999 |
| JP | 2001-159730 | 6/2001 |
| JP | 2004-117490 | 4/2004 |
| JP | 2006-138966 | 6/2006 |
| JP | 2010-026009 | 2/2010 |
| JP | 2010-085699 | 4/2010 |
| JP | 2010-128395 | 6/2010 |
| JP | 2012-098594 | 5/2012 |

OTHER PUBLICATIONS

Extended European Search Report issued Jan. 3, 2014 in Patent Application No. 12734627.8.

Japanese Office Action mailed Jun. 4, 2015, in Patent Application No. 2011-004858.

* cited by examiner

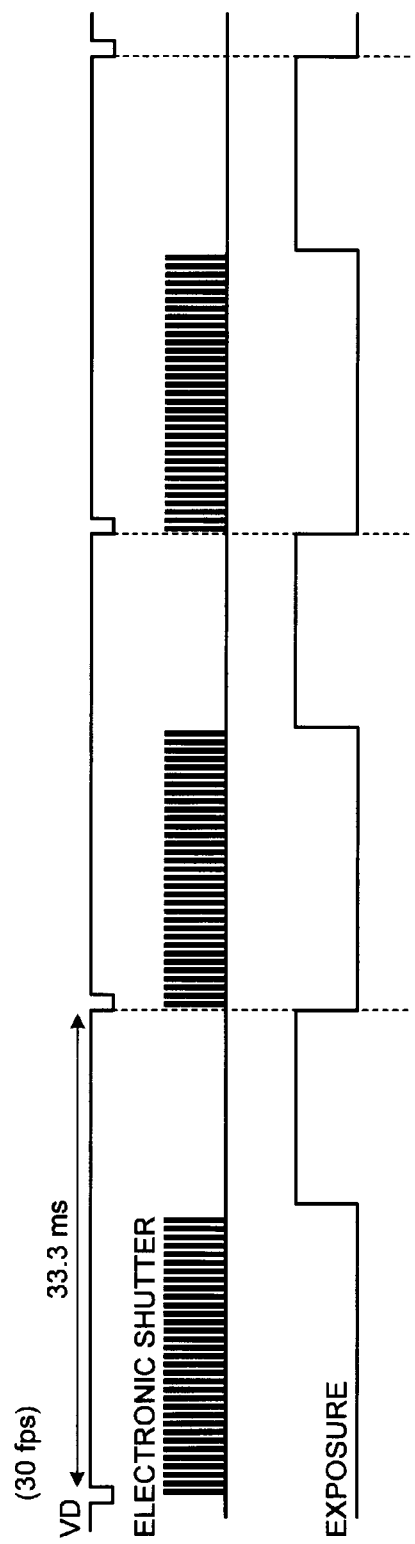

FIRST RANGE-
FINDING SENSOR

SECOND RANGE-
FINDING SENSOR

FIG.11

| Y1 | Y2 | Y3 | Y4 | Y5 | Y6 | Y7 | Y8 | Y9 | Y10 | Y11 | Y12 | Y13 | Y14 | Y15 | Y16 |
|---|---|---|---|---|---|---|---|---|---|---|---|---|---|---|---|
| Y17 | Y18 | Y19 | Y20 | Y21 | Y22 | Y23 | Y24 | Y25 | Y26 | Y27 | Y28 | Y29 | Y30 | Y31 | Y32 |
| Y33 | Y34 | Y35 | Y36 | Y37 | Y38 | Y39 | Y40 | Y41 | Y42 | Y43 | Y44 | Y45 | Y46 | Y47 | Y48 |
| Y49 | Y50 | Y51 | Y52 | Y53 | Y54 | Y55 | Y56 | Y57 | Y58 | Y59 | Y60 | Y61 | Y62 | Y63 | Y64 |
| Y65 | Y66 | Y67 | Y68 | Y69 | Y70 | Y71 | Y72 | Y73 | Y74 | Y75 | Y76 | Y77 | Y78 | Y79 | Y80 |
| Y81 | Y82 | Y83 | Y84 | Y85 | Y86 | Y87 | Y88 | Y89 | Y90 | Y91 | Y92 | Y93 | Y94 | Y95 | Y96 |
| Y97 | Y98 | Y99 | Y100 | Y101 | Y102 | Y103 | Y104 | Y105 | Y106 | Y107 | Y108 | Y109 | Y110 | Y111 | Y112 |
| Y113 | Y114 | Y115 | Y116 | Y117 | Y118 | Y119 | Y120 | Y121 | Y122 | Y123 | Y124 | Y125 | Y126 | Y127 | Y128 |
| Y129 | Y130 | Y131 | Y132 | Y133 | Y134 | Y135 | Y136 | Y137 | Y138 | Y139 | Y140 | Y141 | Y142 | Y143 | Y144 |
| Y145 | Y146 | Y147 | Y148 | Y149 | Y150 | Y151 | Y152 | Y153 | Y154 | Y155 | Y156 | Y157 | Y158 | Y159 | Y160 |
| Y161 | Y162 | Y163 | Y164 | Y165 | Y166 | Y167 | Y168 | Y169 | Y170 | Y171 | Y172 | Y173 | Y174 | Y175 | Y176 |
| Y177 | Y178 | Y179 | Y180 | Y181 | Y182 | Y183 | Y184 | Y185 | Y186 | Y187 | Y188 | Y189 | Y190 | Y191 | Y192 |
| Y193 | Y194 | Y195 | Y196 | Y197 | Y198 | Y199 | Y200 | Y201 | Y202 | Y203 | Y204 | Y205 | Y206 | Y207 | Y208 |
| Y209 | Y210 | Y211 | Y212 | Y213 | Y214 | Y215 | Y216 | Y217 | Y218 | Y219 | Y220 | Y221 | Y222 | Y223 | Y224 |
| Y225 | Y226 | Y227 | Y228 | Y229 | Y230 | Y231 | Y232 | Y233 | Y234 | Y235 | Y236 | Y237 | Y238 | Y239 | Y240 |
| Y241 | Y242 | Y243 | Y244 | Y245 | Y246 | Y247 | Y248 | Y249 | Y250 | Y251 | Y252 | Y253 | Y254 | Y255 | Y256 |

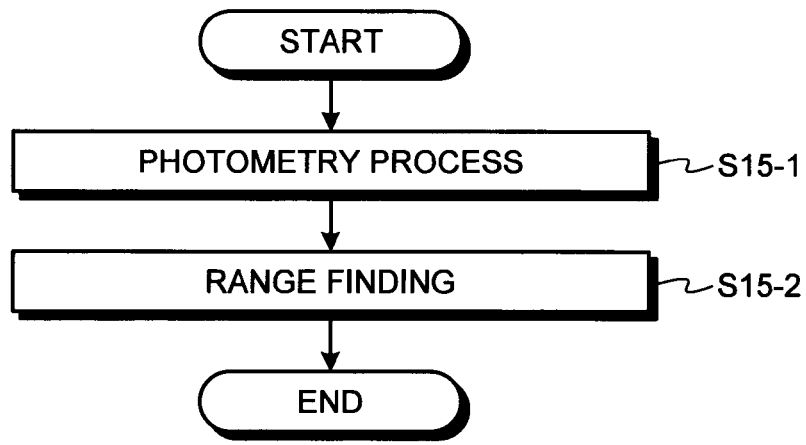
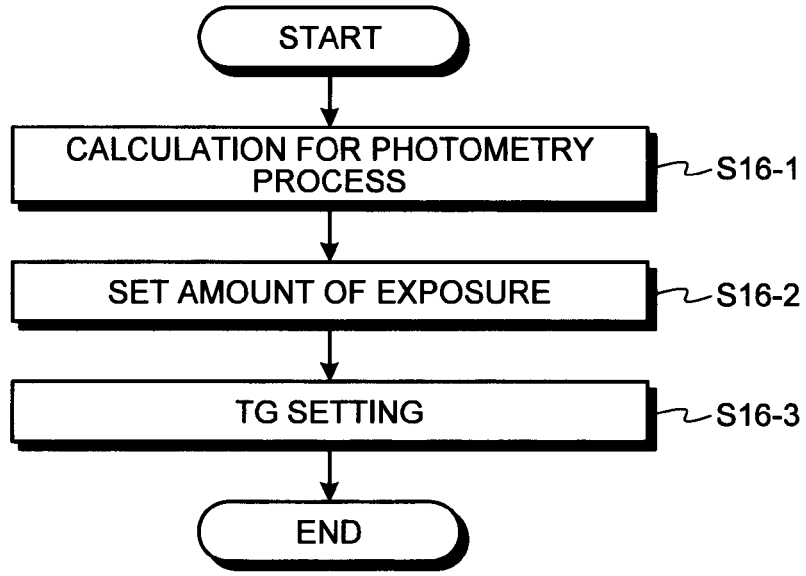

FIG.18A
FIG.18B
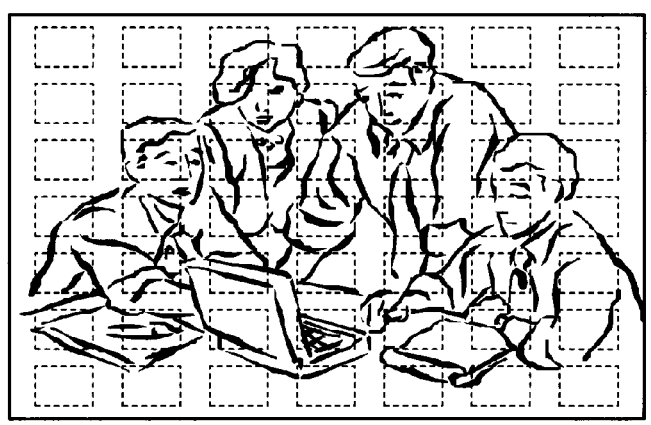
FIG.18C

|   | 1/DISTANCE [m] |
|---|---|
| A | 0.67 |
| B | 0.5 |
| C | 0.3 |
| D | 0.62 |
| E | 0.7 |

FIG.19A
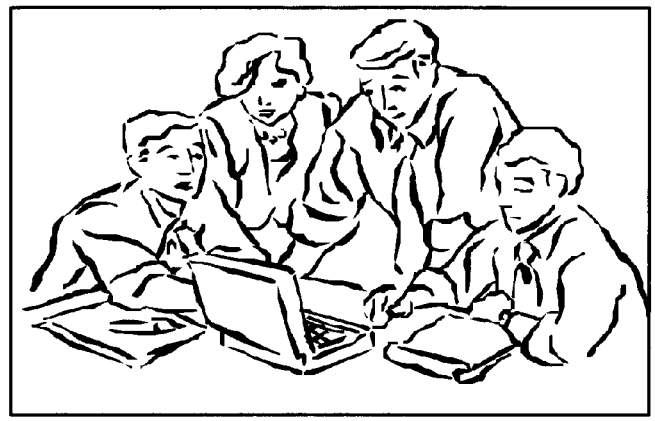
FIG.19B
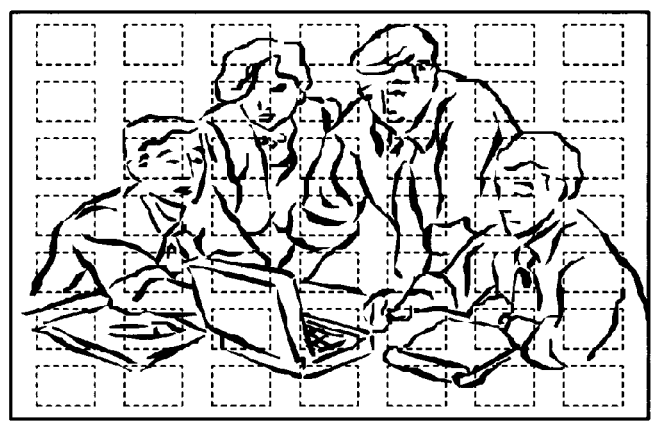
FIG.19C
| 0.33 | 0.33 | 0.4 | 0.36 | 0.63 | 0.33 | 0.33 |
|---|---|---|---|---|---|---|
| 0.33 | 0.33 | 0.59 | 0.36 | 0.63 | 0.63 | 0.33 |
| 0.33 | 0.67 | 0.59 | 0.63 | 0.63 | 0.7 | 0.33 |
| 0.4 | 0.67 | 0.59 | 0.63 | 0.63 | 0.7 | 0.33 |
| 0.67 | 0.67 | 0.67 | 0.67 | 0.71 | 0.7 | 0.67 |
| 0.77 | 0.77 | 0.83 | 0.83 | 0.71 | 0.71 | 0.71 |
| 1 | 1 | 1 | 1 | 1 | 1 | 1 |

|   | 1/DISTANCE [m] |
|---|---|
| A | 0.67 |
| B | 0.5 |
| C | 0.63 |
| D | 0.7 |

TAP        PRESS-AND-HOLD        DRAG

US 9,106,837 B2

IMAGE CAPTURING DEVICE AND IMAGE CAPTURING METHOD

TECHNICAL FIELD

The present invention relates to an image capturing device and an image capturing method.

BACKGROUND ART

An electronic image capturing device, such as a digital still camera, generally includes an autofocus (AF) unit that automatically focuses on an object. As an AF control method for the AF unit, hill-climbing AF control is widely used (see, for example, Japanese Examined Patent Application Publication No. S39-5265). The hill-climbing AF control is performed by calculating an integral of differences in luminance of adjacent pixels based on a video signal output from an image sensor and by using the integral of the differences in luminance as an AF evaluation value for evaluating a degree of focusing. At an in-focus state, edge portion of an object is highly contrasting, and hence the differences in luminance of the neighboring pixels are large; accordingly, the AF evaluation value is large. In contrast, in an out-of-focus state, the edge portion of the object is blurred, and hence the differences in luminance of the neighboring pixels are small; accordingly, the AF evaluation value is small. During AF operation, the AF unit causes a lens to move while obtaining a sequence of AF evaluation values one after another, and causes the lens to stop at a position serving as an in-focus position where the AF evaluation value is maximized, or, put another way, at a peak position.

In recent years, there is provided a technology for implementing a function effective for a scene that includes a large number of focal distances in a view as in a case of taking a close-up photograph of flowers. This technology allows a user to select an image focused on a desired area after shooting by causing a camera to automatically determine focal distances from the camera to multiple points based on information on objects, perform high-speed continuous shooting while focusing is shifted to each of the distances, and store resultant images of the shooting as electronic files in the Multi-Picture Format.

Disclosed in Japanese Patent Application Laid-open No. H04-158322 is a technology (automatic tracking feature) for obtaining an average value (center of gravity) of luminance distribution in a focus area, detecting movement of an object by comparing the average values between different frames, causing the focus area to shift to a new focus area by tracking the movement, and detecting an in-focus position in the new focus area.

Proposed in Japanese Patent Application Laid-open No. 2010-128395 is an image capturing device that determines an autofocus area based on a line designated by a user on a screen so that a focusing-target object can be designated accurately.

However, according to the conventional AF technology disclosed in Japanese Examined Patent Application Publication No. S39-5265 or the like, AF range-finding scanning is performed prior to high-speed continuous shooting. It is already known that this AF range-finding scanning is time consuming because the AF range-finding scanning is performed by obtaining AF evaluation values while a focusing lens is moved over an entire area where the focusing lens is movable and selecting peak positions one after another.

The technology disclosed in Japanese Patent Application Laid-open No. H04-158322 or No. 2010-128395 that allows designating an object to be focused is also time consuming in processing time involved in auto focusing, which can result in losing a good opportunity for shooting a photograph.

The present invention has been conceived in view of the above circumstances and provides an image capturing device and an image capturing method with which a user can continuously take desired photographs at desired instants associated with fast range-finding processes.

DISCLOSURE OF INVENTION

It is an object of the present invention to at least partially solve the problems in the conventional technology.

An image capturing device includes: an image capturing unit that captures a subject image through a lens and converts the subject image into an electric signal; an image displaying unit that displays an image based on the electric signal from the image capturing unit; a designation accepting unit that is provided on a display surface of the image displaying unit and that accepts designation of a plurality of positions on the image displayed on the image displaying unit; a range-finding unit that performs range finding of a distance to a subject by using a plurality of two-dimensional image sensors; an area setting unit that sets a range-finding area obtained from a range finding result that is output from the range-finding unit for a region that includes the plurality of positions designated through the designation accepting unit; a position determining unit that determines a plurality of in-focus positions based on distances of the range-finding areas set by the area setting unit; and a continuous shooting unit that performs image capturing at the plurality of the in-focus positions determined by the position determining unit.

An image capturing method for capturing an image is performed in an image capturing device that includes: an image capturing unit that captures a subject image through a lens and converts the subject image into an electric signal; an image displaying unit that displays an image based on the electric signal from the image capturing unit; a designation accepting unit that is provided on a display surface of the image displaying unit and that accepts designation of a plurality of positions on the image displayed on the image displaying unit; and a range-finding unit that performs range finding of a distance to a subject by using a plurality of two-dimensional image sensors. The image capturing method includes: causing a control unit that controls the image capturing device to perform: setting, as an area setting unit, a range-finding area obtained from a range finding result that is output from the range-finding unit for a region that includes the plurality of positions designated through the designation accepting unit; determining, as a position determining unit, a plurality of in-focus positions based on distances of the range-finding areas set by the area setting unit; and performing, as a continuous shooting unit, image capturing at the plurality of in-focus positions determined by the position determining unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 7 is a timing chart illustrating image-signal acquisition timing of the image sensor.

FIG. 11 is a diagram illustrating an example of divided areas inside a charge coupled device (CCD) that is one of the image sensors of the range-finding unit.

FIG. 15 is a flowchart for explaining the photometry and range-finding processes.

FIG. 16 is a flowchart for explaining photometry in the photometry and range-finding processes illustrated in FIG. 15.

FIG. 18A is a diagram for explaining processes from the range-finding process to an area setting process according to the first embodiment.

FIG. 18B is a diagram for explaining the processes from the range-finding process to the area setting process according to the first embodiment.

FIG. 18C is a diagram for explaining the processes from the range-finding process to the area setting process according to the first embodiment.

FIG. 19A is a diagram for explaining processes from a range-finding process to an area setting process according to the second embodiment.

FIG. 19B is a diagram for explaining the processes from the range-finding process to the area setting process according to the second embodiment.

FIG. 19C is a diagram for explaining the processes from the range-finding process to the area setting process according to the second embodiment.

BEST MODE(S) FOR CARRYING OUT THE INVENTION

Image capturing devices and image capturing methods according to exemplary embodiments of the present invention are described in detail below with reference to the accompanying drawings.

Outline of Embodiments

According to an aspect of the exemplary embodiments, an image capturing device and an image capturing method are characterized in that the image capturing device that includes a touch panel on an image monitor screen performs multi-target auto focusing (hereinafter, auto focusing is referred to as "AF") by utilizing two-dimensional image sensors as a range-finding unit, determining a first focusing-target object with a touch operation performed first, subsequently determining other focusing-target object(s) other than the first focusing-target object through drawing a track that includes the other focusing-target object(s) by a drag operation, and finally determining a last focusing-target object by a detach operation, and hence is capable of selecting positions of the objects at a plurality of points by a single gesture operation.

[Configuration of Digital Still Camera]

The configuration of a digital still camera according to an embodiment is described first with reference to FIGS. 1 to 5 below.

(Appearance of Digital Still Camera)

Figure 1:
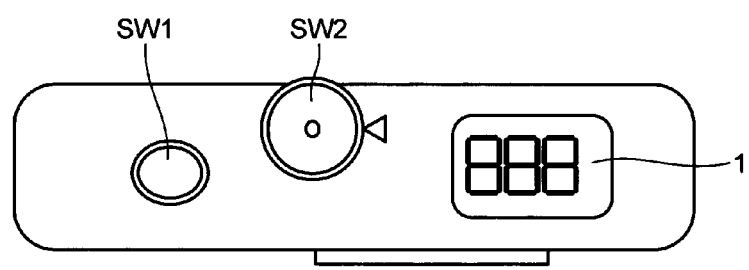
FIG. 1 is a top view illustrating an example of an appearance of a digital still camera according to an embodiment.
Figure 2:
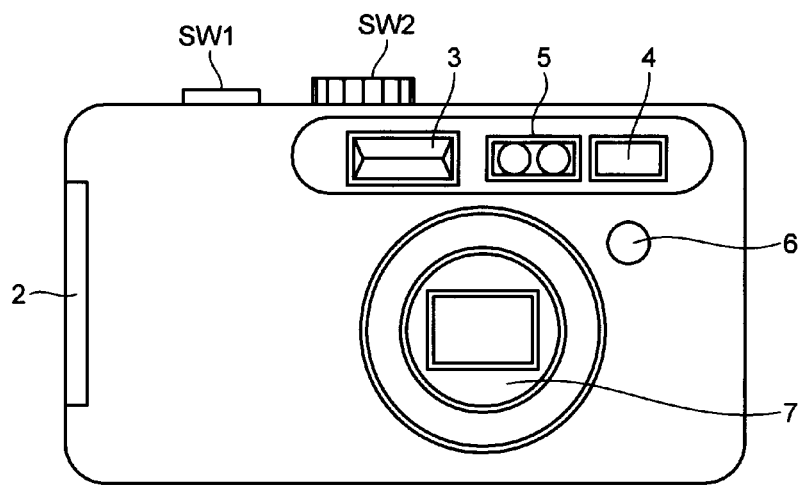
FIG. 2 is a front view illustrating the example of the appearance of the digital still camera.
Figure 3:
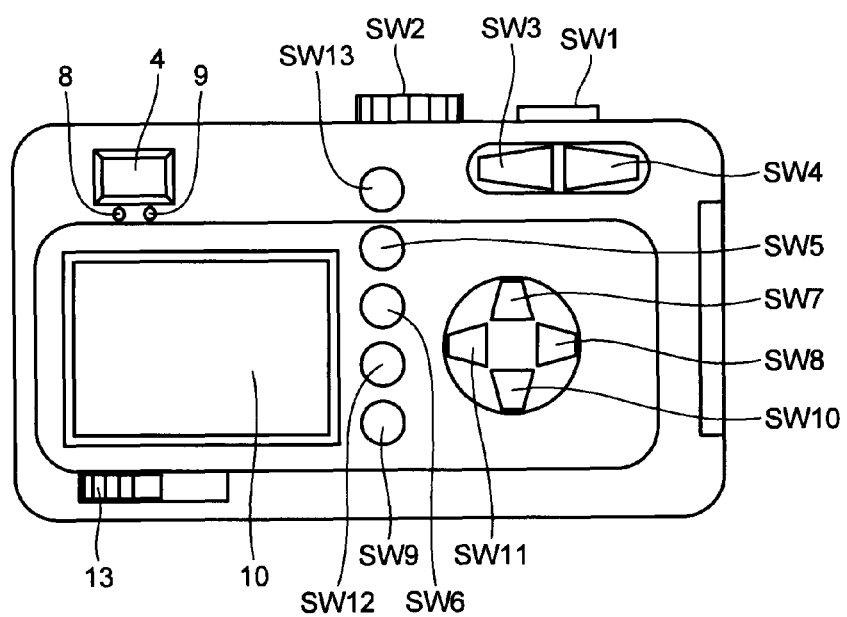
FIG. 3 is a back view illustrating the example of the appearance of the digital still camera.

FIG. 1 to FIG. 3 are views illustrating, respectively, a top view, a front view, and a back view of an example of appearance of the digital still camera according to the first embodiment. As illustrated in FIG. 1, a release switch SW1, a mode dial SW2, and a touch-panel sub liquid crystal display (LCD) 1 are provided on a top surface of the digital still camera. As illustrated in FIG. 2, the digital still camera includes, on a front surface, a lens barrel unit 7 that includes a taking lens, an optical viewfinder 4, a strobe-light emitting unit 3, a range-finding unit 5, a light-receiving unit 6 used for remote control, and a lid 2 of a memory-card slot and a battery slot. As illustrated in FIG. 3, the digital still camera includes, on a back surface, a power switch 13, an LCD monitor 10 that includes a touch panel, an AF light-emitting diode (LED) 8 serving as a signal of AF, a strobe LED 9, the optical viewfinder 4, a wide-angle zooming switch SW3, a telescopic zooming switch SW4, a self-timer set/unset switch SW5, a menu switch SW6, an upward/strobe-light switch SW7, a rightward switch SW8, a display switch SW9, a downward/macro switch SW10, a leftward/image-viewing switch SW11, an OK switch SW12, and a quick-access switch SW13 that enables a quick access to photograph setting. In the meantime, functions of the elements described above are similar to those of known digital still cameras.

(Exemplary System Configuration of Digital Still Camera)

Figure 4:
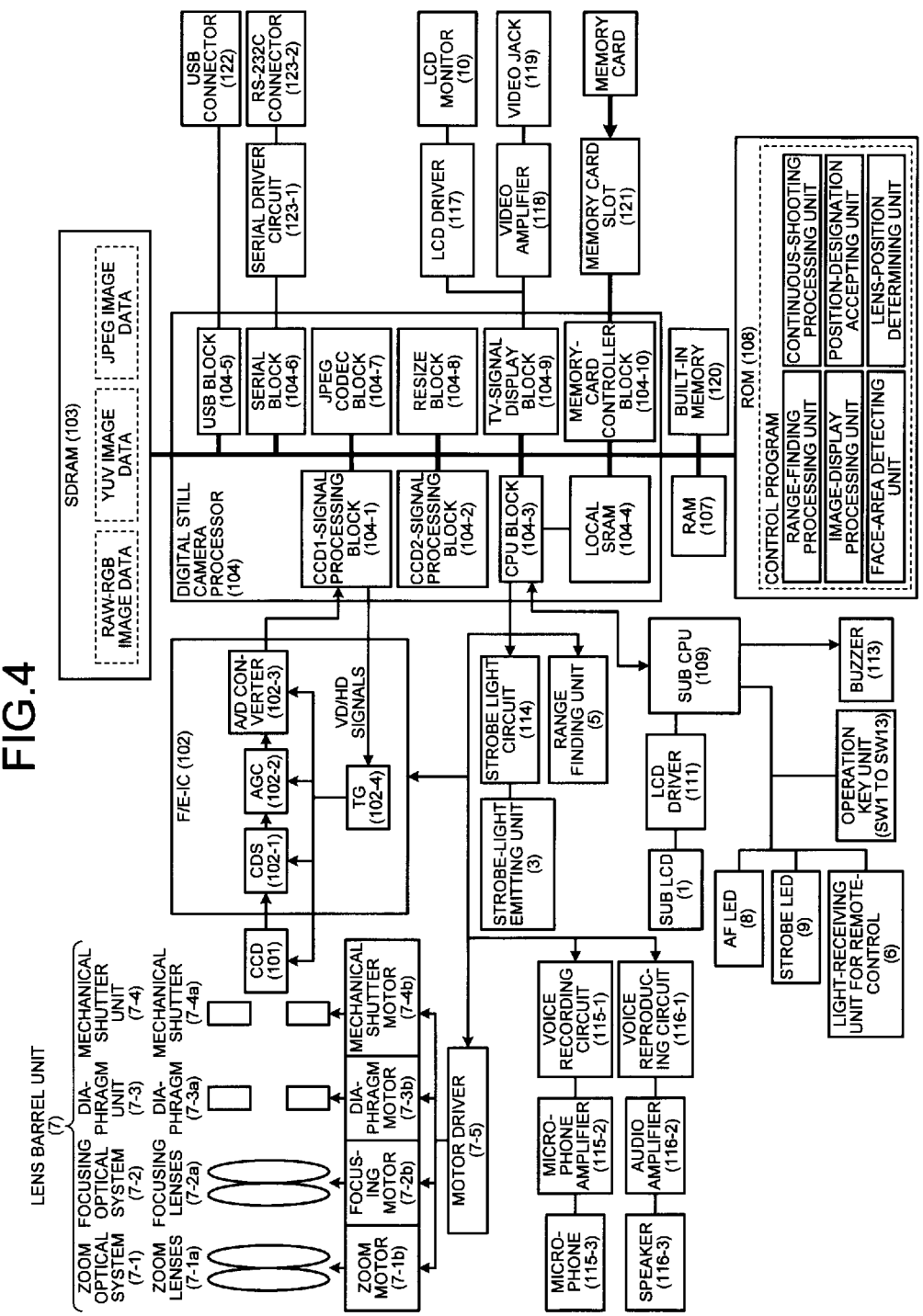
FIG. 4 is a block diagram illustrating an exemplary configuration of an internal system of the digital still camera.

FIG. 4 is a block diagram illustrating an exemplary system configuration inside the digital still camera. As illustrated in FIG. 4, the digital still camera is configured so that elements are controlled by a digital still camera processor 104 (hereinafter, referred to as a "processor 104"). The processor 104 includes a first charge coupled device (CCD1)-signal processing block 104-1, a second CCD (CCD2)-signal processing block 104-2, a central processing unit (CPU) block 104-3, a local static random access memory (SRAM) 104-4, a Universal Serial Bus (USB) block 104-5, a serial block 104-6, a JPEG codec block 104-7, a resize block 104-8, a TV-signal display block 104-9, and a memory-card controller block 104-10, which are mutually connected through a bus line.

The CCD1-signal processing block 104-1 supplies a vertical synchronizing signal VD and a horizontal synchronizing signal HD to a timing generator (TG) 102-4. The CCD2-signal processing block 104-2 converts an input signal into luminance data and color difference data through a filtering process.

The CPU block 104-3 of the processor 104 is configured to control a voice recording operation performed by a voice recording circuit 115-1. Voice is converted by a microphone 115-3 into an audio signal, which is input into a microphone amplifier 115-2 that outputs an amplified signal. The voice recording circuit 115-1 records the amplified signal according to an instruction input from the CPU block 104-3.

The CPU block 104-3 also controls an operation of a voice reproducing circuit 116-1. The voice reproducing circuit 116-1 is configured to reproduce a voice signal recorded in an appropriate memory, input the voice signal into an audio amplifier 116-2, and cause a speaker 116-3 to output voice according to an instruction input from the CPU block 104-3.

The CPU block 104-3 is also configured to cause the strobe-light emitting unit 3 to emit illumination light by controlling an operation of a strobe light circuit 114. The CPU block 104-3 further controls an operation of the range-finding unit 5.

The CPU block 104-3 is connected to a sub CPU 109 provided externally to the processor 104. The sub CPU 109 controls displaying performed by the sub LCD 1 through an LCD driver 111. The sub CPU 109 is further connected to, and control, the AF LED 8, the strobe LED 9, the light-receiving unit 6, an operation key unit that formed by the switches SW1 to SW13, and a buzzer 113.

The local SRAM 104-4 temporarily stores data involved in a control operation and the like. The USB block 104-5 is connected to a USB connector 122, through which the USB block 104-5 performs USB communications with external equipment such as a personal computer (PC). The serial block 104-6 is connected to an RS-232C connector 123-2 via a serial driver circuit 123-1 to perform serial communications with external equipment such as the PC. The JPEG codec block 104-7 performs JPEG compression and decompression. The resize block 104-8 increases/reduces an image data size by interpolation. The TV-signal display block 104-9 is connected to the LCD monitor 10 via an LCD driver 117 and also connected to a video jack 119 via a video amplifier 118. The TV-signal display block 104-9 converts image data into video signals to be displayed on an external display device, such as an LCD monitor or a TV. The memory card controller block 104-10 is connected to a contact point with a memory card in a memory card slot 121 and controls the memory card that stores captured image data.

A synchronous dynamic RAM (SDRAM) 103 for temporarily storing image data that is to be subjected to various processing is provided externally to the processor 104, and is connected to the processor 104 via the bus line. Examples of the image data to be stored in the SDRAM 103 include "RAW-RGB image data" that is input from a CCD 101 via a front-end integrated circuit (F/E-IC) 102 and has been processed white balance correction and gamma correction by the CCD1-signal processing block 104-1, "YUV image data" for which luminance-data conversion/color-difference-data conversion has been performed by the CCD2-signal processing block 104-2, and "JPEG image data" for which JPEG compression has been performed by the JPEG codec block 104-7.

RAM 107, built-in memory 120, and a read only memory (ROM) 108 are also provided externally to the processor 104 and connected to the processor 104 via the bus line. The ROM 108 stores control program written in program codes that can be read by the CPU block 104-3, parameters for control operations thereof, and the like. When power supply to the digital still camera is turned on by an operation of the power switch 13, the control program is loaded from the ROM 108 to the local SRAM 104-4 or the RAM 107 that is utilized also as a main memory. The CPU block 104-3 controls an operation of each of the elements in the device according to the control program. The built-in memory 120 is a memory for use as a memory that stores captured image data. The built-in memory 120 is provided so that captured image data can be stored even when a memory card is not inserted in the memory card slot 121.

The control program includes various processing programs such as a "range-finding processing unit" that has a range-finding-area setting function for processing an output (result of range finding) from the range-finding unit 5 and setting a range-finding area; a "designation accepting unit" that determines a position on a touch panel touched by a user based on information input through the touch panel and accepts the input information; a "face-area detecting unit" that detects a face area of a subject in image data stored in the SDRAM 103 (a face area is an area that includes contours of a face of the subject); an "image-display processing unit" that displays an area(s) designated on the touch panel or image data on the LCD; a "continuous-shooting processing unit" that has a function of a so-called high-speed continuous shooting for capturing still images continuously at high speed; and a "lens-position determining unit" that has a function of determining an in-focus position for converting distance data in a distance list, which will be described later, into in-focus positions of respective focusing lenses 7-2a.

The lens barrel unit 7 includes a zooming optical system 7-1 that includes zooming lenses 7-1a, a focusing optical system 7-2 that includes the focusing lenses 7-2a, a diaphragm unit 7-3 that includes a diaphragm 7-3a, and a mechanical shutter unit 7-4 that includes a mechanical shutter 7-4a. The zooming optical system 7-1, the focusing optical system 7-2, the diaphragm unit 7-3, and the mechanical shutter unit 7-4 are configured to be driven by a zooming motor 7-1b, a focusing motor 7-2b, a diaphragm motor 7-3b, and a mechanical shutter motor 7-4b, respectively. The motors are configured such that an operation of each motor is controlled by a motor driver 7-5 that is controlled by the CPU block 104-3 of the processor 104.

The lens barrel unit 7 includes the taking lens, through which a subject image is to be formed on the CCD 101 serving as the image sensor. The CCD 101 converts the subject image into image signals and input the image signals to the F/E-IC 102. The front-end IC F/E-IC 102 includes, as is known, a correlated double sampling (CDS) 102-1 that performs correlated double sampling for image noise reduction, an automatic gain controller (AGC) 102-2 that adjusts gain, and an analogue-to-digital (A/D) converter 102-3 that performs an A/D conversion, each of which performs a predetermined processing on the image signals to convert the image signals into digital signals and inputs the digital signals to the CCD1-signal processing block 104-1 of the processor 104. These signal processing operations are controlled, via the TG 102-4, by the VD/HD signals output from the CCD1-signal processing block 104-1 of the processor 104.

Figure 5:
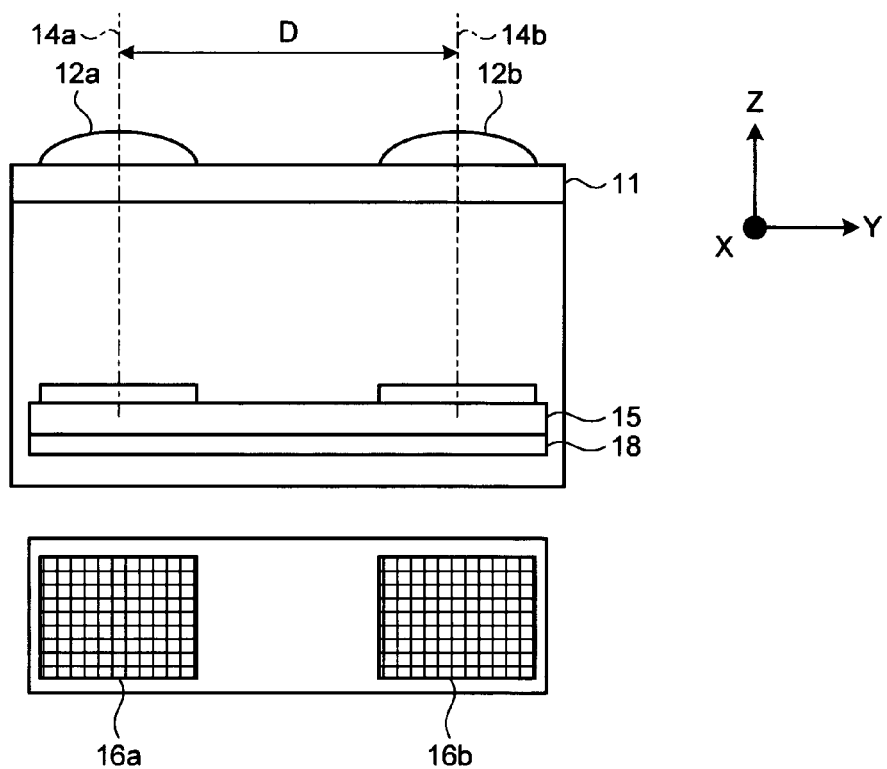
FIG. 5 is a diagram illustrating an internal configuration of a range-finding unit included in the digital still camera.

The range-finding unit 5 solely includes a CPU. Accordingly, the range-finding unit 5 can be operated asynchronously with other processes in the digital still camera. FIG. 5 is an internal configuration diagram of the range-finding unit 5.

(Configuration of Range Finding Unit)

As illustrated in FIG. 5, a lens array 11 includes lenses 12a and 12b that are formed in an integrated manner with each other. The lenses 12a and 12b are range-finding lenses and identical in shape and focal distance. An optical axis 14a of the lens 12a and an optical axis 14b of the lens 12b are parallel to each other. A distance between the optical axis 14a and the optical axis 14b configures a baseline length D.

Here, as illustrated in FIG. 5, let us assume the Z axis to be along the optical axes 14a and 14b, the Y axis to be perpendicular to the Z axis and to be in a direction pointing from the optical axis 14a to the optical axis 14b, and the X axis to be in a direction perpendicular to both the Z axis and the Y axis. The lenses 12a and 12b are arranged in the X-Y plane so that centers of the lenses 12a and 12b are placed on the Y axis. In this arrangement, a direction along which a parallax $\Delta$ is formed becomes the Y axis.

An image sensor 15 is a sensor to capture an image, and is embodied by a complementary metal oxide semiconductor (CMOS) or a CCD, which is manufactured by forming a large number of light-receiving elements (pixels) on a wafer by a semiconductor process. The present embodiment will be described by using CCDs. On the image sensor 15, an image capturing area 16a and an image capturing area 16b are provided to be separated from each other. A subject image is formed on the image capturing areas 16a and 16b through the range-finding lenses 12a and 12b, respectively.

The image capturing area 16a and the image capturing area 16b are identical in size and shape of rectangular areas; the image capturing areas 16a and 16b are provided so that central diagonals of the rectangular areas nearly coincide with the optical axes 14a and 14b of the respective lenses 12a and 12b. In the range-finding unit 5 of the present embodiment, the image capturing area 16a and the image capturing area 16b are provided to be separated from each other. When the image capturing areas are not separated from each other, there is a need to provide a wall or the like to partition the image capturing areas 16a and 16b from each other so as to prevent a light beam that is supposed to enter one of the image capturing areas 16a and 16b from entering another image capturing area. However, the range-finding unit 5 according to the present embodiment does not require such a structure.

Figure 6:
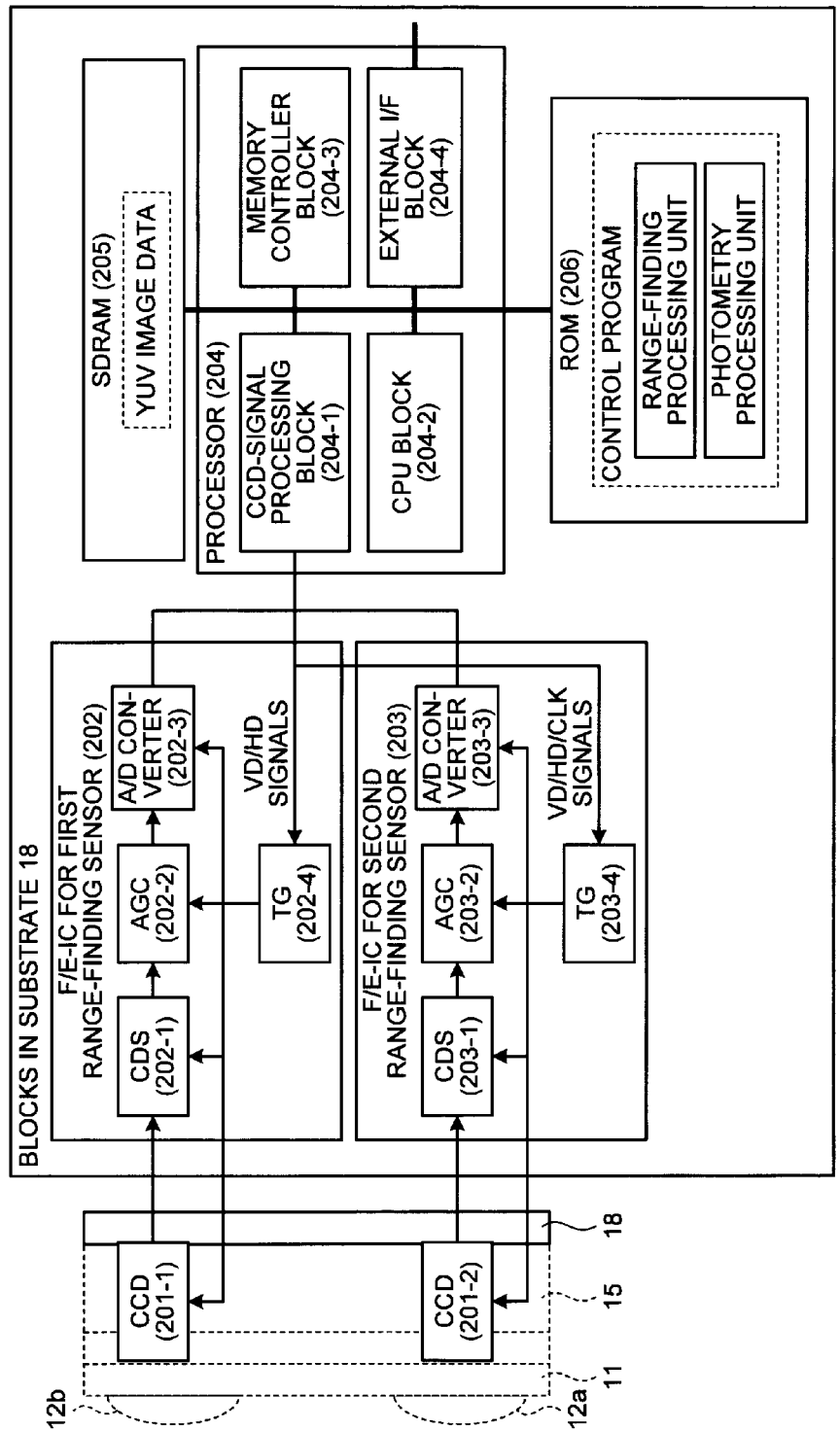
FIG. 6 is an internal block diagram of substrates of image sensors.

A substrate 18 that includes a digital signal processor (DSP) (not shown) is provided under the image sensor 15. FIG. 6 illustrates an internal block diagram of the substrate 18. In the configuration illustrated in FIG. 6, the image sensor 15 is configured to be controlled by a processor 204.

The processor 204 includes a CCD-signal processing block 204-1, a CPU block 204-2, a memory controller block 204-3, and an external interface (I/F) block 204-4, which are mutually connected via a bus line. An SDRAM 205 that stores YUV image data is provided externally to the processor 204, with which the SDRAM 205 is connected via the bus line. A ROM 206 that stores control program is also provided externally to the processor 204, with which the ROM 206 is connected via the bus line.

In the substrate 18, image signals of subject images from CCD 201-1 and CCD 201-2 of the image sensor 15 are input into an F/E-IC 202 and an F/E-IC 203, respectively. In the present embodiment, the range-finding unit 5 includes two image sensors, each of which has a first range-finding sensor F/E-IC 202 and a second range-finding sensor F/E-IC 203. As already described before, F/E-IC is an abbreviation for a front-end integrated circuit, and the F/E-IC 202 and F/E-IC 203 respectively include CDS 202-1 and CDS 203-1 that perform correlated double sampling; AGC 202-2 and AGC 203-2 that adjust gain; and A/D converters 202-3 and 203-3 that perform A/D conversion for converting an image signal into a digital signal, which is input into the CCD-signal processing block 204-1 of the processor 204. These signal processing operations are controlled, via a TG 202-4 and a TG 203-4, according to VD/HD/CLK signals, which are synchronizing signals output from the CCD-signal processing block 204-1 of the processor 204.

The control program stored in the ROM 206 is configured so that the CCD-signal processing block 204-1 can perform control operations of the control program on each of the two image sensors 201-1 and 201-2. The control program includes a range-finding-processing unit block for performing a range-finding process on each of the image sensors 201-1 and 201-2 and a photometry-processing unit block for performing a photometry process on each of the same.

Capturing timing of an image signal by the image sensor is controlled in synchronization with the VD signal. In the present embodiment, the capturing timing is set to be driven at a frame rate of 30 frames per seconds (fps). FIG. 7 is a timing chart of the capturing timing, illustrating that exposure can be controlled by setting capture timing of an electronic shutter.

The external I/F block 204-4 allows outputting a result of range finding (distance distribution) and a result of photometry, outputting image data input from the two image sensors, and carrying out communications with the digital still camera. Accordingly, it is possible to cause an element other than the range-finding unit 5, in the digital still camera, to do a calculation to obtain output data.

[Basic Principle of Range Finding and Photometry]

Basic principle of range finding and photometry will be descried below. First, the basic principle of range finding is described through an example of a range-finding method using line sensors illustrated in FIGS. 8A and 8B.

Figure 8A:
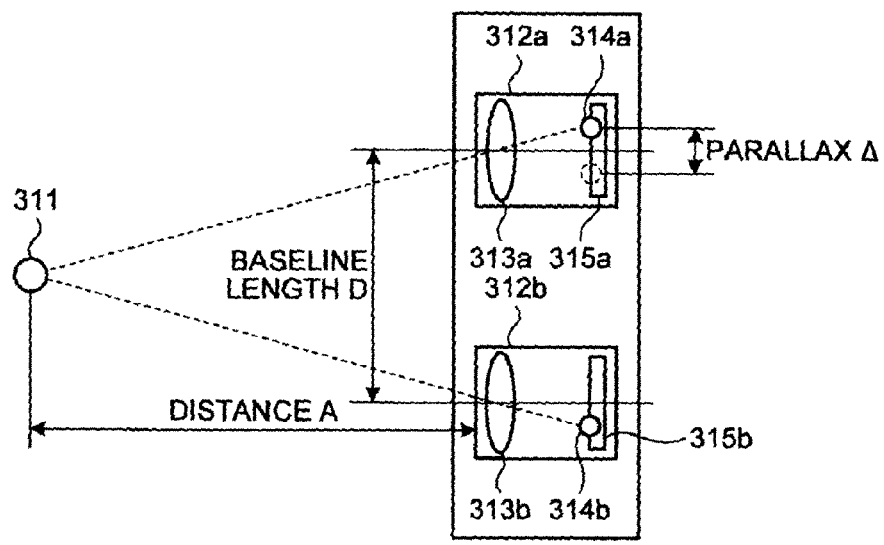
FIG. 8A is a diagram for explaining basic principle (range-finding method with line sensors) of range finding and photometry.
Figure 8B:
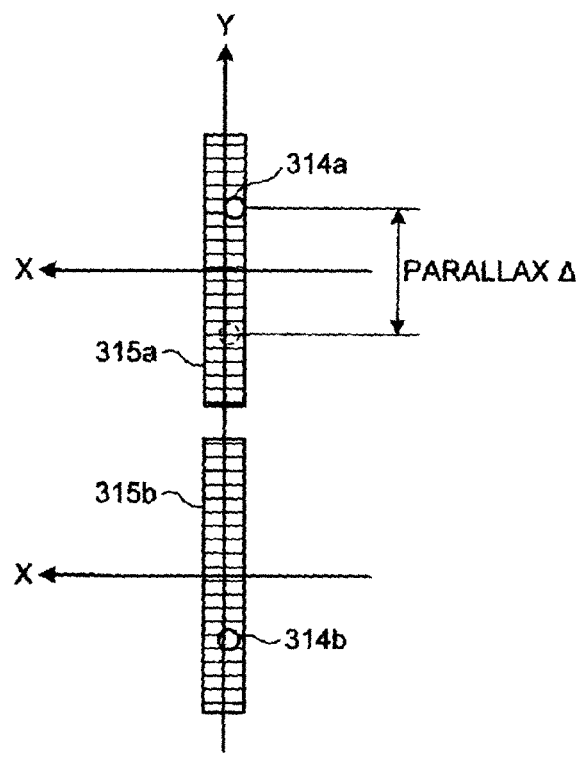
FIG. 8B is a diagram for explaining basic principle (range-finding method with line sensors) of range finding and photometry.

Let us consider a case in which light reflected from a subject 311 is captured with two digital still cameras 312a and 312b having identical optical systems with each other, as illustrated in FIGS. 8A and 8B. A first subject image 314a obtained through a lens 313a and a second subject image 314b obtained through a lens 313b reach a line sensor 315a and a line sensor 315b, respectively, such that a same point on the subject is displaced by a parallax $\Delta$ on the line sensors 315a and 315b, on which the subject images 314a and 314b are received by a plurality of light-receiving elements (pixels) and converted into electrical signals. Here, a distance between optical axes of the lenses 313a and 313b is referred to as the baseline length, which is denoted by D; a distance between the lenses and the subject is denoted by A; a focal length of the lenses is denoted by f. When A>>f, Equation (1) holds.

$$A = Df/\Delta \quad (1)$$

Because the baseline length D and the focal length f of the lenses are known, if the parallax Δ is detected, the distance A to the subject can be calculated. A method of determining the distance A from the parallax Δ of the two images is called the triangulation. Each of the line sensors is provided at a center portion, at which resolution of a lens is high across an entire field of view. Accordingly, a focus is to be at the center portion of the field of view.

[Range Finding and Photometry to be Performed by Range Finding Unit of Present Embodiment]

Figure 9:
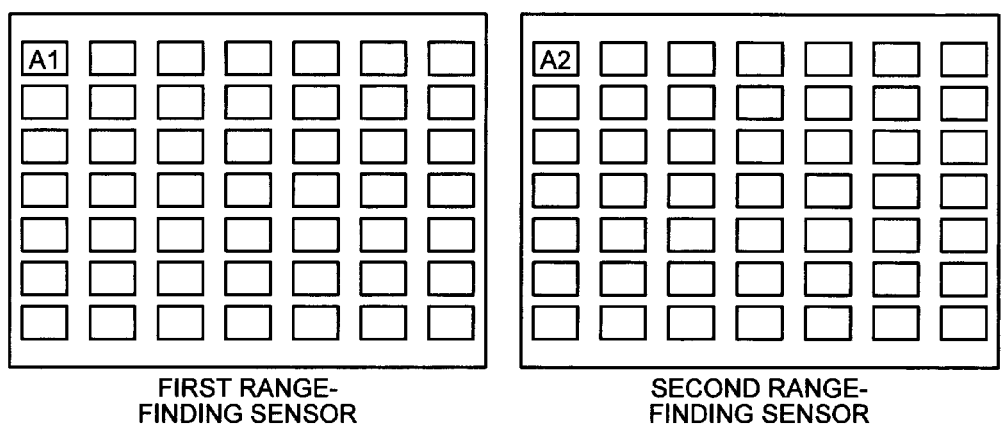
FIG. 9 is a configuration diagram illustrating an example of two-dimensional areas arranged on the image sensors.
Figure 10:
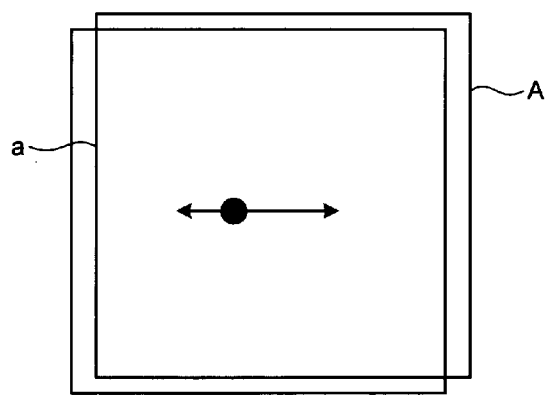
FIG. 10 is a diagram explaining the range-finding process by the range-finding unit of the digital still camera.

The range-finding unit 5 of the present embodiment includes two-dimensional sensors and two-dimensionally implements the principle described above. FIG. 9 is a diagram illustrating a configuration of a two-dimensional area provided on the image sensor 15. The parallax is determined by determining a difference between a detection result obtained by the first range-finding sensor (CCD 201-1) and a detection result obtained by the second range-finding sensor (CCD 201-2) for each of the areas. For example, number of pixels corresponding to the displacement between an area "A1" of the first range-finding sensor CCD 201-1 illustrated in FIG. 9 and an area "A2", which corresponds to the area "A1", of the second range-finding sensor CCD 201-2 is determined while shifting the areas by several pixels each time in the horizontal direction, as illustrated in FIG. 10, to find a position where the number of pixels is minimized, thereby determining a parallax of the areas. The distance A is determined from Equation (1) by using the parallax Δ. In some cases, the distance cannot be determined; this can occur with a subject, such as sky, from which a parallax cannot be obtained. In such a case, the distance A is to be set to zero because range finding cannot be performed.

In contrast, the range-finding unit 5 of the present embodiment has a photometry function because the range-finding unit 5 can change the amount of exposure. In the present embodiment, the entire field of view is divided into a plurality of areas by multi-segmenting the image capturing area of the image sensor, and brightness of each area is measured. FIG. 11 illustrates the divided areas in any one of the CCD 201-1 and the CCD 201-2, which are the image sensors of the range-finding unit 5. For example, image signals output from the CCD 201-2 are passed to the CCD-signal processing block 204-1 via the F/E-IC 203. An evaluation value of each area is obtained by adding Y values (luminance), which are from the YUV image data stored in the SDRAM 205, of the divided areas and performing multiplication by the number of target pixels. A proper amount of exposure is calculated based on luminance distribution of the divided areas obtained from the evaluation values, thereby detecting brightness of the subject. If the detected brightness of the subject is bright or dark relative to the proper amount of exposure, the processor 104 controls the mechanical shutter unit 7-4 and changes the setting of the electronic shutter, thereby changing the amount of exposure.

[Overview of Operations of Conventional Digital Still Camera]

Before the operations of the digital still camera configured as above are explained, overview of operations of a conventional digital still camera is described below.

Setting the mode dial SW2 illustrated in FIG. 1 to a recording mode causes the digital still camera to start up in the recording mode. When the mode dial SW2 is set, the CPU detects that a state of the mode dial SW2 of the operation key unit (SW1 to SW13) illustrated in FIG. 4 has entered the recording mode and controls the motor driver 7-5 to move the lens barrel unit 7 to a position where an image can be captured. Furthermore, the CPU turns on power supply to elements, such as the CCD101, the F/E-IC 102, and the LCD monitor 10, to cause the elements to start operations. When power is supplied to each of the elements, operations in a viewfinder mode are started.

In the viewfinder mode, light incident on the image sensor (CCD 101) through the lenses is converted into electric signals, and sent to the CDS circuit 102-1, the AGC 102-2, and the A/D converter 102-3 as analogue RGB signals. Each of the signals converted into digital signals by the A/D converter 102-3 is converted into YUV signals by a YUV converter in the CCD2-signal processing block 104-2, and written into the SDRAM 103 by a memory controller (not shown). The YUV signals are read out by the memory controller and sent, via the TV-signal display block 104-9, to the TV or the LCD monitor 10 to be displayed thereon. This sequence of processes is performed at 30 fps (at intervals of 1/30 second). Hence, image display in the viewfinder mode, in which image is updated every 1/30 second, is performed.

[Operations of Digital Still Camera According to Present Embodiment]

The operations of the digital still camera according to the present embodiment are described below. A high-speed continuous shooting process, which is a feature of the present embodiment, is described below through a first embodiment and a second embodiment.

First Embodiment

Figure 12:
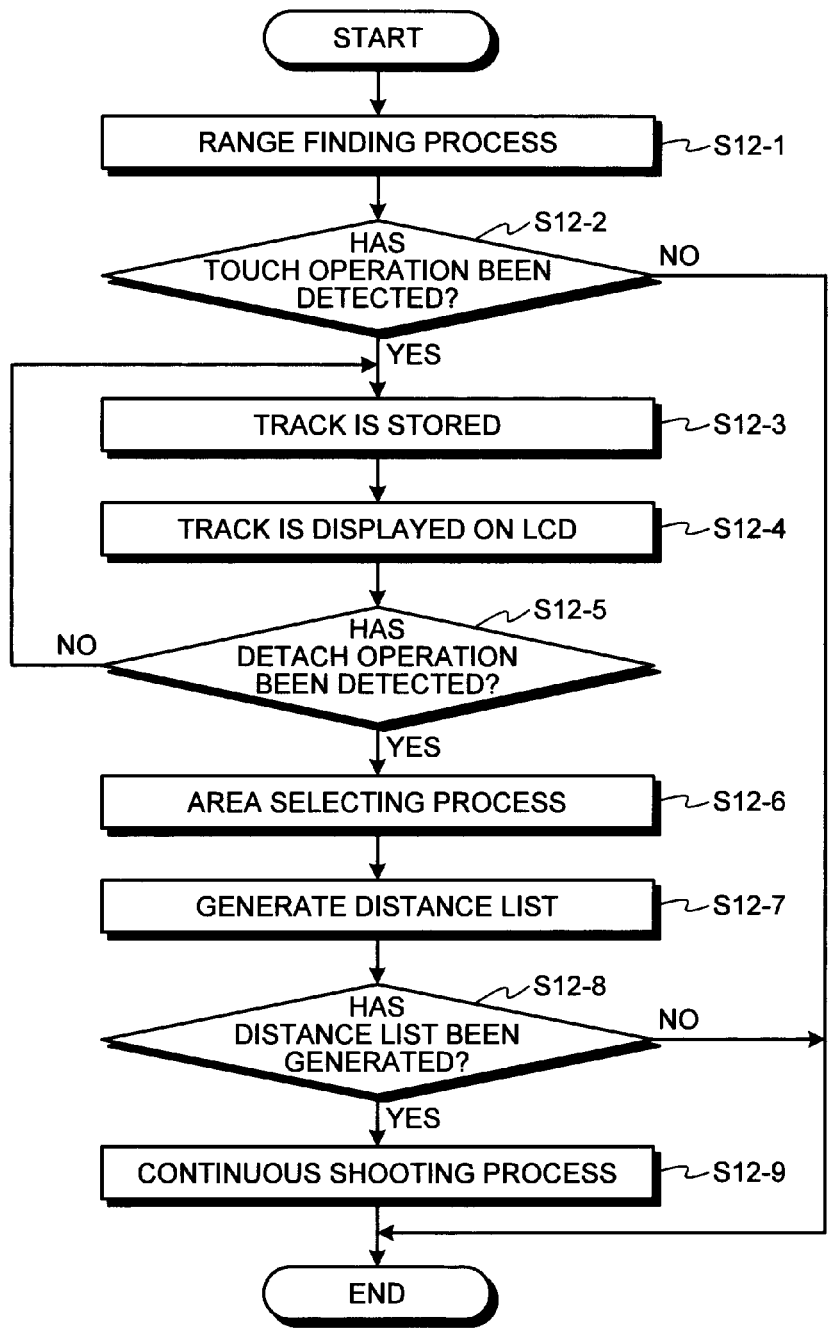
FIG. 12 is a flowchart illustrating a processing flow from a viewfinder mode to high-speed continuous shooting.

First, the first embodiment of the high-speed continuous shooting process to be performed by the digital still camera according to the present embodiment is described. FIG. 12 is a flowchart illustrating a processing flow from the viewfinder mode to high-speed continuous shooting of the first embodiment. Description will be made below with reference to the flowchart.

Immediately after power supply is turned on, the digital still camera is in the viewfinder mode. In the viewfinder mode, a range-finding process by using the range-finding unit 5 is performed first (S12-1). The range-finding process is described with reference to flowcharts of FIGS. 15 and 16.

First, the CPU block 204-2 performs a photometry process (S15-1) according to the control program (range-finding processing unit) stored in the ROM 206 inside the range-finding unit 5. The photometry process (S15-1) is illustrated in the flowchart of FIG. 16.

First, evaluation values for automatic exposure are calculated as described above based on image signals obtained by exposure and then converted by YUV conversion at the CCD-signal processing block 204-1 (S16-1).

Subsequently, distribution of Y values (luminance) of a subject is obtained from the evaluation values, and an amount of exposure (shutter speed) for achieving proper exposure is set (S16-2).

Finally, the thus-set amount of exposure is applied to the TG 202-4 and the TG 203-4 of the range-finding sensors (S16-3). Meanwhile, a result of the photometry is preferably stored in the SDRAM 205 so that the result of the photometry can be transmitted from the range-finding unit 5 via the external I/F block 204-4 when the digital still camera starts image capturing. This allows eliminating the need for elements other than the range-finding unit 5 in the digital still camera to perform the photometry, thereby reducing processing time.

Referring back to FIG. 15, the first and second range-finding sensors perform exposure based on the exposure settings set in the photometry setting described above to obtain image signals, based on which range finding process (S15-2) is performed. The range finding process (S15-2) is illustrated in the flowchart of FIG. 17.

Figure 17:
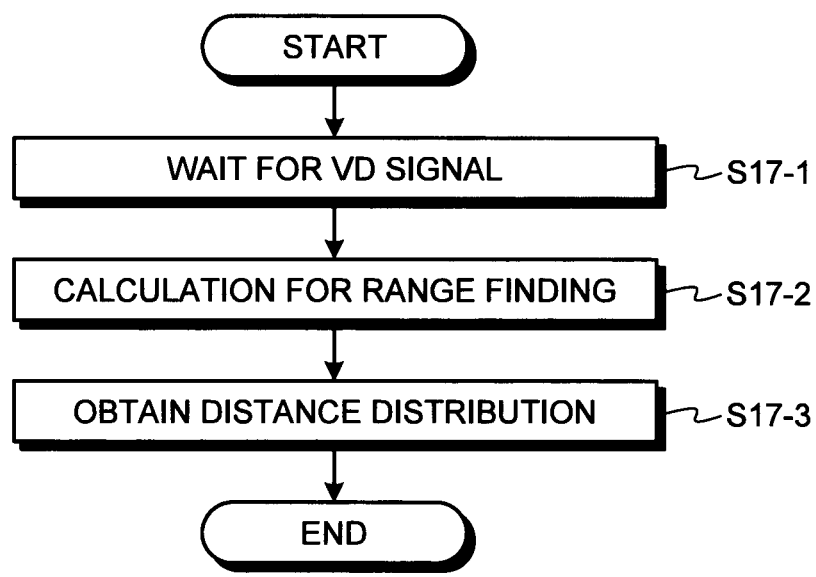
FIG. 17 is a flowchart for explaining the range-finding process in the photometry and range-finding processes illustrated in FIG. 15.

In FIG. 17, first, process control waits for a VD signal to provide exposure timing to the two range-finding sensors, i.e., the first and second range-finding sensors (S17-1).

Subsequently, calculation for range finding is performed on such areas as illustrated in FIG. 9 based on image signals obtained by the exposure and the YUV conversion performed at the CCD-signal processing block 204-1 (S17-2). In the present embodiment, 49 (=7×7) areas are evenly arranged across the image capturing area. Regarding the number of areas, a result of calculation for range finding to a minuter subject can be output by setting the number of areas to a larger value.

Subsequently, distance-distribution generating process is performed based on the result of the range-finding calculation (S17-3). For example, a scene illustrated in FIG. 18A is divided into 49 areas, as illustrated in FIG. 18B, and distance distribution illustrated in FIG. 18C is generated. Each numerical value in FIG. 18C is a reciprocal of a distance (in 1/meters). The range finding is performed as described above.

Figure 20A:
FIG. 20A is a diagram illustrating a "tap" operation that can be performed on a touch panel.
Figure 20B:
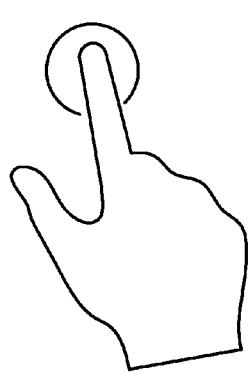
FIG. 20B is a diagram illustrating a "press-and-hold" operation that can be performed on a touch panel.
Figure 20C:
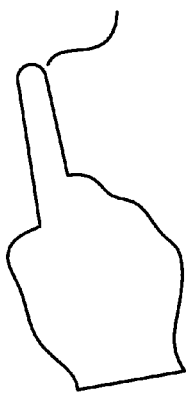
FIG. 20C is a diagram illustrating a "drag" operation that can be performed on a touch panel.

Referring back to FIG. 12, it is detected whether a touch operation is performed on the touch panel. A touch operation that can be performed on the touch panel includes three kinds of operations: a "tap" operation, a "press-and-hold" operation, and a "drag" operation, as illustrated in FIGS. 20A to 20C. In the first embodiment, "touch" means start of (c), or the drag operation, and "detecting whether a touch operation is performed" means that a drag operation is started. In contrast, "detached" is detected when a user completes the drag operation and removes his/her finger from the touch panel.

When a touch operation is detected (YES at S12-2), the coordinates of a touched point are stored in the SDRAM 103 in a track storing process (S12-3). When a user drags his/her finger on the touch panel, coordinates of the touched point on the touch panel change. By recording the coordinates, a track generated by the drag operation of the user can be stored.

Figure 18D:
FIG. 18D is a diagram for explaining the processes from the range-finding process to the area setting process according to the first embodiment.

The track generated by the drag operation is displayed on the LCD monitor 10 based on the stored coordinates (S12-4). FIG. 18D illustrates an example of a state where the track is displayed on the LCD.

While a detach operation is not detected (NO at S12-5), the track storing process (S12-3) and the track displaying process (S12-4) are repeatedly performed.

Figure 13:
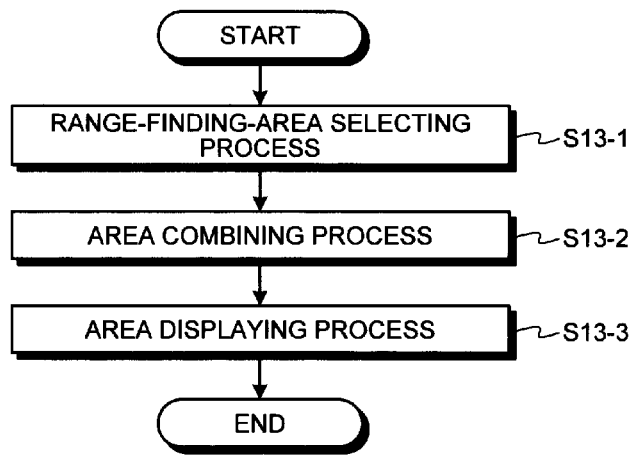
FIG. 13 is a flowchart for explaining an area selecting process according to a first embodiment.

When a detach operation is detected (YES at S12-5), an area selecting process for selecting, from the track generated by the drag operation, a region that overlaps the range-finding areas is performed (S12-6). (Hereinafter, an area calculated from the result of the range finding output from the range-finding unit is referred to as a "range-finding area.") The area selecting process is illustrated in the flowchart of FIG. 13.

Figure 18E:
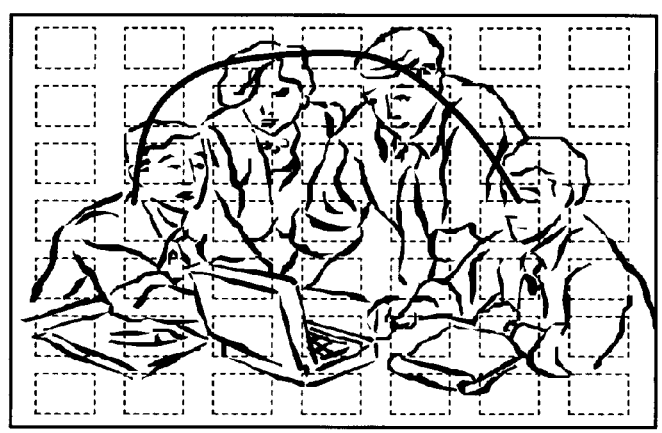
FIG. 18E is a diagram for explaining the processes from the range-finding process to the area setting process according to the first embodiment.
Figure 18F:
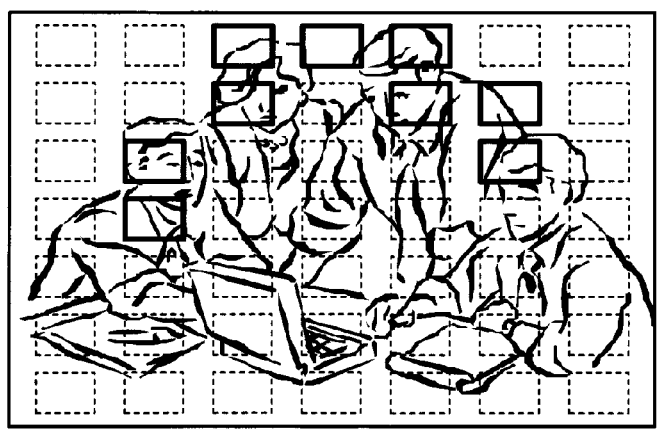
FIG. 18F is a diagram for explaining the processes from the range-finding process to the area setting process according to the first embodiment.

First, range-finding areas that overlap the track generated by the drag operation are extracted (S13-1). For example, FIG. 18F illustrates a state where a plurality of areas has been selected by extraction of areas that overlap the range-finding areas illustrated in FIG. 18E.

Figures 18G, 18H:
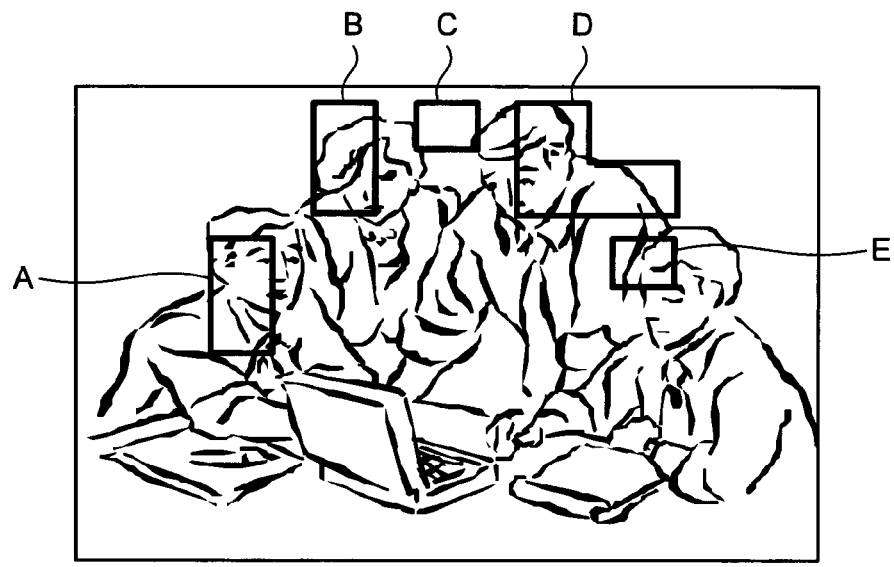
FIG. 18G is a diagram for explaining the processes from the range-finding process to the area setting process according to the first embodiment.
FIG. 18H is a diagram for explaining the processes from the range-finding process to the area setting process according to the first embodiment.

Subsequently, subjects, in the respective range-finding areas, that are at similar distances from the camera are determined as the same subject, and an area combining process (S13-2) is performed on the areas. This process includes extracting range-finding areas that have similar values to each other in the reciprocal of the distance based on the distance distribution output from the range-finding unit 5, and combining the extracted areas into a single area. FIG. 18G illustrates an example of the thus-combined areas. More specifically, the digital still camera according to the present embodiment obtains, from this scene, five areas A to E illustrated in FIG. 18G and results of range finding with respect to the areas. An average value obtained by taking an average of the results of the range finding with respect to the areas that are combined is stored in the SDRAM 103 as a result of range-finding calculation of the combined area.

Finally, the range-finding areas are displayed as illustrated in FIG. 18G such that each combined area is displayed with, e.g., a frame, as a focus area, for which an in-focus position is to be determined (S13-3). The area selecting processing has been described as above.

Referring back to FIG. 12, a distance list is generated by using the results of range finding on the plurality of areas that have been set in the area selecting process (S12-7). For example, the five areas are extracted from the scene illustrated in FIG. 18. Accordingly, distance data of the five areas are to be extracted. FIG. 18H illustrates a distance list of the five areas displayed in the reciprocals of the distances.

When the distance list is generated (YES at S12-8), a continuous shooting process for performing high-speed continuous shooting based on the distance list is started (S12-9). The high-speed continuous shooting process may be started when any one of the frames of the focus areas displayed on a captured image displayed on the LCD monitor 10 is tapped or touched via the touch panel or in response to a predetermined switch operation.

In the first embodiment, a sequence of operations including converting distance data in the distance list into in-focus positions of the respective focusing lenses 7-2a, moving the focusing lenses to the positions, and then image capturing is performed for each of the distances. Performing operations in this manner makes it possible to perform high-speed continuous shooting at higher speed only for distances desired by a user without performing hill-climbing AF operations, thereby reducing processing time involved in image capturing. As for exposure, an image can be captured either by using a result of photometry obtained by elements other than the range-finding unit 5 provided in the digital still camera in advance in the viewfinder mode or by using a result of photometry obtained by the range-finding unit 5. However, use of the result of photometry obtained by the range-finding unit 5 that uses the two-dimensional image sensors, which are more appropriate for high speed processing, speeds up processing involved in image capturing. Furthermore, using the result of photometry obtained by the range-finding unit 5 yields an effect of not losing a good opportunity for shooting a photograph.

Furthermore, high-speed continuous shooting is to be performed only at in-focus positions of specific range-finding areas. Accordingly, images that are unnecessary for a user are excluded from a photograph, enabling optimization of the number of photographs to be taken in the continuous shooting.

The first embodiment of the high-speed continuous shooting process that can be performed by the digital still camera has been described above.

Second Embodiment

A second embodiment of the high-speed continuous shooting process that can be performed by the digital still camera is described below. A basic processing flow from the viewfinder mode to the high-speed continuous shooting of the second embodiment is substantially the same as that described in the first embodiment with reference to the flowchart of FIG. 12. The range-finding process using the range-finding unit 5 is also substantially the same as that described in the first embodiment with reference to FIGS. 15, 16, and 17. Processes that characterize the second embodiment, in addition to the basic processing flow from the viewfinder mode to the high-speed continuous shooting, are described below.

First, when the power supply to the digital still camera is turned on, the digital still camera is set to be in the viewfinder mode. In the viewfinder mode, the range-finding process by using the range-finding unit 5 is performed first (S12-1). The range-finding process is substantially the same as that described in the first embodiment with reference to FIGS. 15, 16, and 17, and repeated description is omitted. In the range-finding process, for example, a scene in FIG. 19A is divided into 49 areas as illustrated in FIG. 19B, and distance distribution illustrated in FIG. 19C is generated. Each of numerical values in the distance distribution is displayed in a reciprocal of the distance (in 1/meters).

Subsequently, it is determined whether the touch operation on the touch panel is performed. Also in the second embodiment, a "touch" means the drag operation as described above, and "detecting whether a touch operation is performed" means that the drag operation is started as described above. In contrast, a "detach" is an opposite operation and is detected when a user completes the drag operation and releases his/her finger from the touch panel.

When a touch operation is detected (YES at S12-2), coordinates of a touched point are stored in the SDRAM 103 in the track storing process (S12-3). When the touched point is dragged on the touch panel, the coordinates of the touched point change. By recording the coordinates, a track drawn by the drag operation performed by a user can be stored.

Figure 19D:
FIG. 19D is a diagram for explaining the processes from the range-finding process to the area setting process according to the second embodiment.

The track of the drag operation is displayed on the LCD monitor 10 based on the coordinates stored in the SDRAM 103 (S12-4). FIG. 19D illustrates an example of a state where the track is displayed on the LCD. While a detach operation is not detected (NO at S12-5), the track storing process (S12-3) and the track displaying process (S12-4) are repeatedly performed.

When a detach operation is detected (YES at S12-5), the area selecting process for selecting, from the track generated by the drag operation, a region that overlaps range-finding areas is performed (S12-6).

Figure 14:
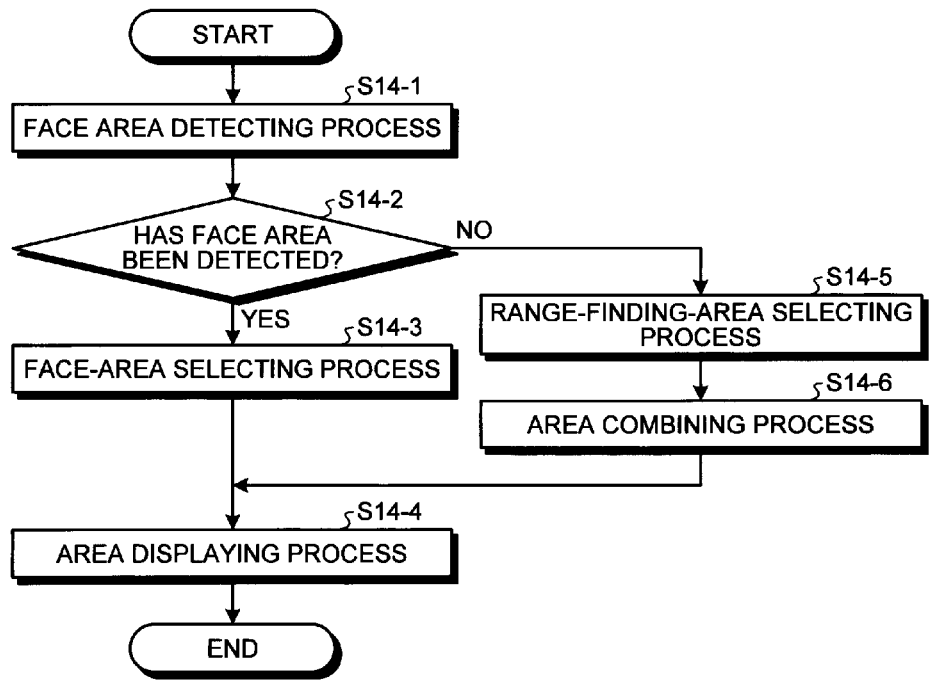
FIG. 14 is a flowchart for explaining an area selecting process according to a second embodiment.

The area selecting process is described with reference to the flowchart in FIG. 14.

First, it is determined whether a face area is on the drag-drawn track (S14-1). Various methods for detecting a face area have already been known in the technical field of digital still cameras. In the second embodiment, one of the methods is to be used. Examples of conventional methods for detecting a face area are described below.

(1) A method of converting a color image into a mosaic image and extracting a face area by utilizing skin-color areas. An example of this method is described in "Proposal of the Modified HSV Colour System Suitable for Human Face Extraction", which has been published in the Journal of the Institute of Television Engineers, Vol. 49, No. 6, pp 787-797, 1995.

(2) A method of extracting a frontal human face area by using geometrical shape features of portions, such as hair, eyes, and a mouth, of a frontal human face. An example of this method is described in "Extraction of Face Regions from Monochromatic Photographs", which has been published in the Journal of the Institute of Electronics, Information and Communication Engineers, Vol. 74-D-II, No. 11, pp 1625-1627, 1991.

(3) A method of extracting a frontal human figure from moving pictures by utilizing outline edges of the human figure generated by subtle motion of the human across a plurality of frames. An example of this method is described in "Face Area Detection for Mobile TV and its Effect", which has been published in Image Laboratory, 1991-11, 1991.

Face detection is performed on image data obtained by the digital still camera in the viewfinder mode by using any one of the methods as those described above for detecting a face area. If the face area is detected (YES at S14-2), the face area is selected. By performing comparison with the distance distribution output from the range-finding unit 5, a range-finding area that overlaps the face area is extracted (S14-3).

Figure 19E:
FIG. 19E is a diagram for explaining the processes from the range-finding process to the area setting process according to the second embodiment.

FIG. 19E illustrates a state where face areas have been detected. In the example illustrated in FIG. 19E, four faces are detected. For each of the face areas A to D, an average value of range-finding areas that are close to the face area is calculated. The average values are stored in the SDRAM 103 as a result of range-finding calculation.

If no face area is detected (NO at S14-2), range-finding areas that overlap a drag-drawn track are extracted as in the first embodiment (S14-5). Areas that overlap the range-finding areas are extracted, and subjects, in the respective range-finding areas, that are at similar distances from the camera are determined as the same subject, thereby an area combining process (S14-6) is performed over the areas. This process includes extracting range-finding areas that are similar to each other in the reciprocal of the distance based on the distance distribution output from the range-finding unit 5, and combining the extracted areas into a single area. Using the results of the range finding of the respective areas, an average value is taken of values in the distance distribution of the areas that are combined. Then, the average values are stored in the SDRAM 103 as a result of range-finding calculation.

Finally, the detected areas (or the combined areas) are displayed as illustrated in FIG. 19E in a manner that each area is displayed with, e.g., a frame, as a focus area, for which an in-focus position is to be determined (S14-4). The area selecting processing has been described above.

Figures 19F, 19G:
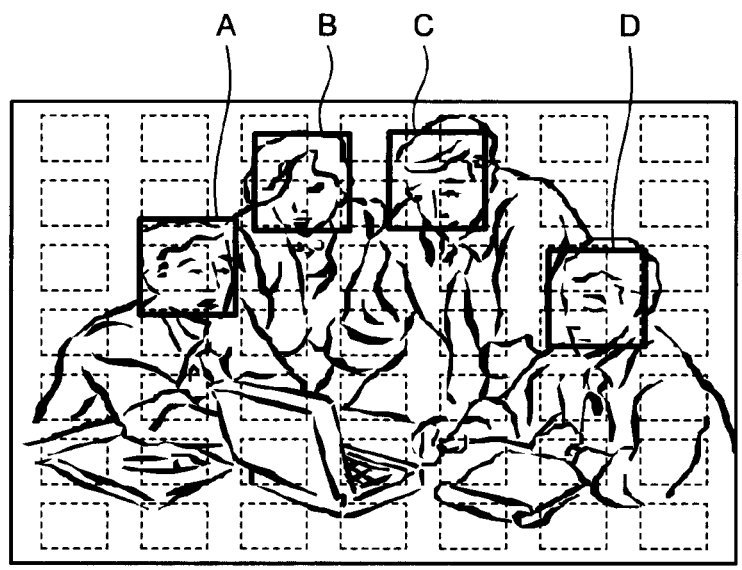
FIG. 19F is a diagram for explaining the processes from the range-finding process to the area setting process according to the second embodiment.
FIG. 19G is a diagram for explaining the processes from the range-finding process to the area setting process according to the second embodiment.

Referring back to FIG. 12, a distance list is generated by using the results of range finding on the plurality of areas that are set in the area selecting process (S12-7). Because the four face areas A to D (FIG. 19F) are extracted from the scene illustrated in FIG. 19A, distance data of the four areas are to be extracted. FIG. 19G illustrates the distance list of the four areas.

When the distance list is generated (YES at S12-8), the continuous shooting process for performing high-speed continuous shooting based on the distance list is started (S12-9). The high-speed continuous shooting process may be started when any one of the frames of the focus areas displayed on a captured image displayed on the LCD monitor 10 is tapped or touched via the touch panel or in response to a predetermined switch operation.

Also in the second embodiment, as in the first embodiment, the sequence of operations including converting distance data in the distance list into in-focus positions of the respective focusing lenses 7-2a, moving the focusing lenses to the positions, and then image capturing is performed for each of the distances. Performing operations in this manner makes it possible to perform high-speed continuous shooting at higher speed only for distances desired by a user without performing hill-climbing AF operations, thereby reducing processing time involved in high-speed continuous shooting. Although a face area is specifically detected in the second embodiment, it is further preferable to provide an actual digital still camera with a face priority mode that is capable of switching between the mode for determining a face area and a mode for determining other objects than the face area. As for exposure, an image can be captured either by using a result of photometry obtained by elements other than the range-finding unit 5 provided in the digital still camera in advance in the viewfinder mode or by using a result of photometry obtained by the range-finding unit 5. However, use of the result of photometry obtained by the range-finding unit 5 with use of the two-dimensional image sensors, which are more appropriate for high speed processing, speeds up processing involved in image capturing. Furthermore, using the result of photometry obtained by the range-finding unit 5 yields an effect of not losing a good opportunity for shooting a photograph.

Furthermore, high-speed continuous shooting is to be performed only at in-focus positions of specific range-finding areas. Accordingly, images that are unnecessary for a user are excluded from a photograph, enabling optimization of the number of photographs to be taken in the continuous shooting.

The second embodiment of the high-speed continuous shooting process that can be performed by the digital still camera according to the present embodiment has been described.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image capturing device comprising:
   an image capturing unit that captures a subject image through a lens and converts the subject image into an electric signal;
   an image displaying unit that displays an image based on the electric signal from the image capturing unit;
   a designation accepting unit
      that is provided on a display surface of the image displaying unit, and
      that accepts designation of a plurality of positions on the image displayed on the image displaying unit;
   a range-finding unit that performs range finding of a distance to a subject by using a plurality of two-dimensional image sensors;
   an area setting unit that sets a range-finding area obtained from a range finding result that is output from the range-finding unit for a region that includes the plurality of positions designated through the designation accepting unit;
   a position determining unit that determines a plurality of in-focus positions of focus areas based on distances of the range-finding areas set by the area setting unit, at least one focus area of the focus areas corresponding to a combination of a plurality of areas having similar distances; and
   a continuous shooting unit that performs image capturing at the plurality of the in-focus positions determined by the position determining unit.

2. The image capturing device according to claim 1, further comprising a face-area detecting unit that detects a face area of the subject, wherein
   the area setting unit sets, when the face-area detecting unit has detected a face area, an area that overlaps the detected face area as the range-finding area.

3. The image capturing device according to claim 1, wherein
   the designation accepting unit accepts, at once, designation of a plurality of positions designated by a touch-and-drag operation performed on the designation accepting unit.

4. The image capturing device according to claim 3, wherein
   when a plurality of positions designated by the touch-and-drag operation are accepted by the designation accepting unit, the plurality of the positions are determined by first performing a touch operation that determines a first position, subsequently by performing a drag operation that determines the plurality of the positions so that the plurality of the positions except the first position are included in a track generated by the drag operation, and finally by performing a detach operation that determines a last position.

5. The image capturing device according to claim 1, wherein
   a frame that indicates a focus area in which an in-focus position is to be determined within a region that includes a plurality of positions designated at once through the designation accepting unit from a user is displayed on the image that is displayed on the image displaying unit.

6. The image capturing device according to claim 1, wherein
   the designation accepting unit includes a touch panel.

7. An image capturing method for capturing an image in an image capturing device that includes
   an image capturing unit that captures a subject image through a lens and converts the subject image into an electric signal;
   an image displaying unit that displays an image based on the electric signal from the image capturing unit;
   a designation accepting unit
      that is provided on a display surface of the image displaying unit, and
      that accepts designation of a plurality of positions on the image displayed on the image displaying unit; and
   a range-finding unit that performs range finding of a distance to a subject by using a plurality of two-dimensional image sensors, the image capturing method comprising:
   setting, by an area setting unit of the image capturing device, a range-finding area obtained from a range finding result that is output from the range-finding unit for a region that includes the plurality of positions designated through the designation accepting unit;
   determining, by a position determining unit of the image capturing device, a plurality of in-focus positions of focus areas based on distances of the range-finding areas set by the area setting unit, at least one focus area of the focus areas corresponding to a combination of a plurality of areas having similar distances; and
   performing, by a continuous shooting unit of the image capturing device, image capturing at the plurality of in-focus positions determined by the position determining unit.

8. The image capturing device according to claim 1, wherein the range-finding unit performs the range finding, without preforming a hill-climbing process.

* * * * *